US010953636B2

(12) United States Patent
Notsu et al.

(10) Patent No.: US 10,953,636 B2
(45) Date of Patent: Mar. 23, 2021

(54) LAMINATED PLATE

(71) Applicant: AGC INC., Tokyo (JP)

(72) Inventors: Keiji Notsu, Tokyo (JP); Atsushi Nakano, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/007,525

(22) Filed: Jun. 13, 2018

(65) Prior Publication Data

US 2018/0290438 A1  Oct. 11, 2018

Related U.S. Application Data

(63) Continuation of application No. PCT/JP2016/086925, filed on Dec. 12, 2016.

(30) Foreign Application Priority Data

Dec. 21, 2015  (JP) .............................. JP2015-248204

(51) Int. Cl.
*B32B 17/10* (2006.01)
*B32B 3/02* (2006.01)
(Continued)

(52) U.S. Cl.
CPC .......... *B32B 17/10293* (2013.01); *B32B 3/02* (2013.01); *B32B 17/10036* (2013.01);
(Continued)

(58) Field of Classification Search
CPC .............................. B32B 17/10293; B32B 3/02
See application file for complete search history.

(56) References Cited

U.S. PATENT DOCUMENTS 2,092,789 A * 9/1937 Tillyer .................... C03B 23/22
156/99
3,282,772 A  11/1966 Davis
(Continued)

FOREIGN PATENT DOCUMENTS

EP  2 708 355 A1  3/2014
EP  2 781 490 A1  9/2014
(Continued)

OTHER PUBLICATIONS

International Search Report with English language translation and Written Opinion issued in International Application No. PCT/JP2016/086925 dated Mar. 14, 2017.
(Continued)

*Primary Examiner* — Samir Shah
*Assistant Examiner* — Tong Guo
(74) *Attorney, Agent, or Firm* — Foley & Lardner LLP

(57) ABSTRACT

A laminated plate includes first and second plates bonded to each other via an intermediate layer. The laminated plate includes a first main surface of the first plate opposite to the intermediate layer; a second main surface of the first plate and a third main surface being in contact with the intermediate layer; a fourth main surface of the second plate opposite to the intermediate layer. A thickness of the first plate is thicker than a thickness of the second plate. In a planar view, the laminated plate includes a peripheral region and an in-plane region. In a cross section orthogonal to an outer periphery of the laminated plate, a distance from an outermost periphery of the second plate to the first plate in a thickness direction with respect to the outermost periphery is three times or less a distance between the first and second plates in the in-plane region.

16 Claims, 6 Drawing Sheets

(51) Int. Cl.
  *B60J 1/00* (2006.01)
  *B60J 1/02* (2006.01)
(52) U.S. Cl.
  CPC .... *B32B 17/10155* (2013.01); *B32B 2307/54* (2013.01); *B32B 2307/732* (2013.01); *B32B 2605/00* (2013.01); *B60J 1/001* (2013.01); *B60J 1/02* (2013.01)

(56) References Cited

U.S. PATENT DOCUMENTS

| | | | |
|---|---|---|---|
| 6,325,704 | B1 | 12/2001 | Brown et al. |
| 8,075,983 | B2 | 12/2011 | Masaki et al. |
| 2002/0150744 | A1* | 10/2002 | Nagai ............... B32B 17/10036 428/215 |
| 2008/0135175 | A1 | 6/2008 | Higuchi |
| 2010/0285260 | A1* | 11/2010 | Bookbinder ............ B32B 3/02 428/45 |
| 2011/0019123 | A1* | 1/2011 | Prest ...................... C03C 19/00 349/58 |
| 2011/0026236 | A1 | 2/2011 | Kondo et al. |
| 2011/0100530 | A1* | 5/2011 | Ujiie ................ B32B 17/10036 156/106 |
| 2012/0202030 | A1* | 8/2012 | Kondo .................... B32B 17/06 428/215 |
| 2014/0014260 | A1* | 1/2014 | Chowdhury ............. B32B 7/02 156/222 |
| 2014/0144313 | A1* | 5/2014 | Bertolini ................... F41H 7/04 89/36.08 |
| 2014/0349058 | A1* | 11/2014 | Inoue ...................... B60J 1/008 428/78 |
| 2015/0108687 | A1 | 4/2015 | Snyder et al. |
| 2015/0110911 | A1 | 4/2015 | Snyder |
| 2015/0112472 | A1 | 4/2015 | Chen et al. |
| 2016/0101463 | A1 | 4/2016 | Snyder et al. |
| 2016/0221265 | A1 | 8/2016 | Snyder et al. |
| 2017/0190152 | A1* | 7/2017 | Notsu .................... B32B 3/263 |

FOREIGN PATENT DOCUMENTS

| | | |
|---|---|---|
| JP | 58-054316 A | 3/1983 |
| JP | 2000-252342 A | 9/2000 |
| JP | 2002-154321 A | 5/2002 |
| JP | 2003-048763 A | 2/2003 |
| JP | 2006-220757 A | 8/2006 |
| JP | 2007-197288 A | 8/2007 |
| JP | 2009-184172 A | 8/2009 |
| JP | 2013-129552 A | 7/2013 |
| TW | 201132503 A1 | 10/2011 |
| WO | WO-2007/018028 A1 | 2/2007 |
| WO | WO-2009/128359 A1 | 10/2009 |
| WO | WO-2011/048978 A1 | 4/2011 |
| WO | WO-2014/098160 A1 | 6/2014 |
| WO | WO-2015/072360 A1 | 5/2015 |

OTHER PUBLICATIONS

International Search Report dated Jan. 18, 2011 for corresponding Application No. PCT/JP2010/067899 (5 pages).
U.S. Office Action dated Nov. 13, 2013 for corresponding U.S. Appl. No. 13/451,508 (12 pages).
U.S. Office Action dated Sep. 26, 2019 for corresponding U.S. Appl. No. 15/380,138 (9 pages).

* cited by examiner

LAMINATED PLATE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/086925 filed on Dec. 12, 2016 and designating the U.S., which claims priority of Japanese Patent Application No. 2015-248204 filed on Dec. 21, 2015. The entire contents of the foregoing applications are incorporated herein by reference.

BACKGROUND OF THE INVENTION

1. Field of the Invention

The disclosure herein generally relates to a laminated plate.

2. Description of the Related Art

Conventionally, for example, for a window glass of a vehicle, a laminated glass obtained by bonding a first glass plate and a second glass plate via an intermediate film has been used.

Japanese Unexamined Patent Application Publication No. 2013-129552 discloses a laminated glass in which an irregular reflection of light incident to the laminated glass at a periphery portion of the laminated glass is controlled. In the periphery portion of the laminated glass, in which outer peripheries of two glass plates are overlaid, a part where the two glass plates and an intermediate film are not bonded was removed.

SUMMARY OF THE INVENTION

Technical Problem

In recent years, from a standpoint of compatibility between reduction of a vehicle weight and a stiffness of a window, a laminated glass of differing thicknesses, in which a first glass plate used for the laminated glass is thick and a second glass plate is thin, has been required.

In this case, when two glass plates are bonded so that the outer peripheries of the two glass plates are overlaid, as illustrated in FIG. 7, a distance C in a plate thickness direction with respect to an outermost periphery 705 of the second plate, from the outermost periphery 705 of the second plate to the first plate, becomes large. Thus, the laminated glass becomes easily foamed from the periphery portion. The foam causes an exfoliation of the laminated glass, a decrease in strength, or a degradation of aesthetic appearance.

The aforementioned problem may occur also in a laminated plate. The laminated plate includes a first plate, a second plate, and an intermediate film that bonds the first and second plates.

In view of the aforementioned background, the present invention mainly aims at providing a laminated plate in which a foam formation in the periphery portion is controlled.

Solution to Problem

In order to achieve the aim, the present invention provides a laminated plate provided with a first plate and a second plate bonded to the first plate via an intermediate layer. The laminated plated includes a first main surface of the first plate opposite to the intermediate layer;

a second main surface of the first plate being in contact with the intermediate layer;

a third main surface of the second plate being in contact with the intermediate layer; and a fourth main surface of the second plate opposite to the intermediate layer.

A thickness of the first plate is thicker than a thickness of the second plate.

In a planar view, the laminated plate includes a peripheral region and an in-plane region.

In at least a part of an outer periphery of the laminated plate, in a cross section orthogonal to the outer periphery, a distance from an outermost periphery of the second plate to the first plate in a thickness direction with respect to the outermost periphery is three times or less a distance between the first plate and the second plate in the in-plane region.

Advantageous Effect of Invention

According to an aspect of the present invention, a laminated plate, in which a foam formation in a periphery portion is controlled, can be provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1A:
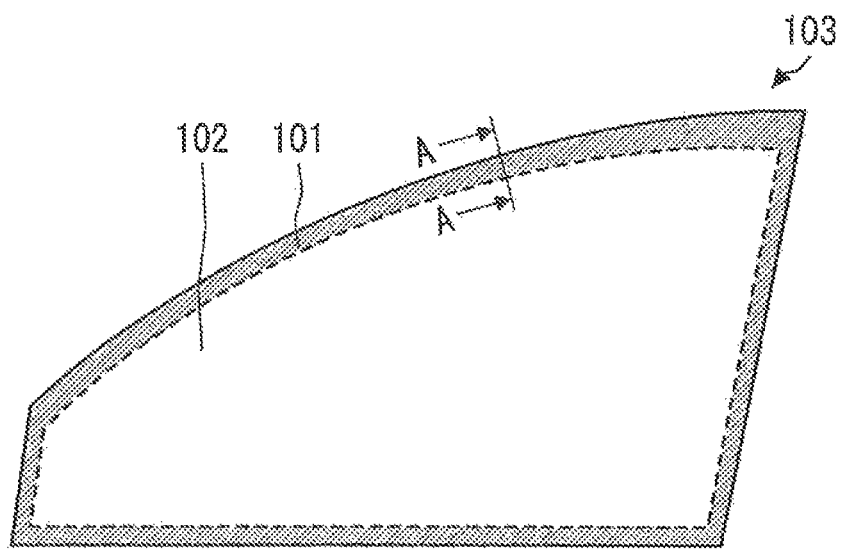
FIG. 1A is a plan view of a laminated plate according to an embodiment of the present invention.

In the following, with reference to drawings, a laminated plate according to an embodiment of the present invention will be described. Note that in the following descriptions, as an example, a laminated glass used for a vehicle window will be described. However, the present invention is not limited to this. For example, the laminated plate may be a window glass for building, a plastic glazing, a plastic plate, a plastic decorative board used for an interior or an exterior of a vehicle, and the like.

Moreover, in the drawings for explaining configurations, coordinates are defined by arrows in the lower left part in each drawing. An explanation will be provided by using the coordinates as necessary. Moreover, in the specification, "X-direction" is assumed to indicate not only a direction from the tail of the arrow representing X-coordinates to the tip, but also a direction inverted by 180 degrees, from the tip to the tail. "Y-direction" and "Z-direction" are also assumed to indicate not only directions from the tails of the arrow representing Y-coordinates and Z-coordinates, respectively, to the tips, but also the respective directions inverted by 180 degrees from the tips to the tails.

In the specification, the X-direction and the Y-direction are also referred to as planar directions, and the Z-direction is also referred to as a plate thickness direction.

Moreover, in the specification, terms such as "parallel" or "orthogonal" allow deviations keeping with the effect of the present invention. For example, errors of about ±5° are allowed from parallel or orthogonal positional relationships in a strict sense.

First Embodiment

Figure 1A:
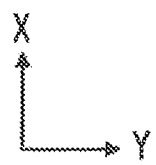
Figure 1B:
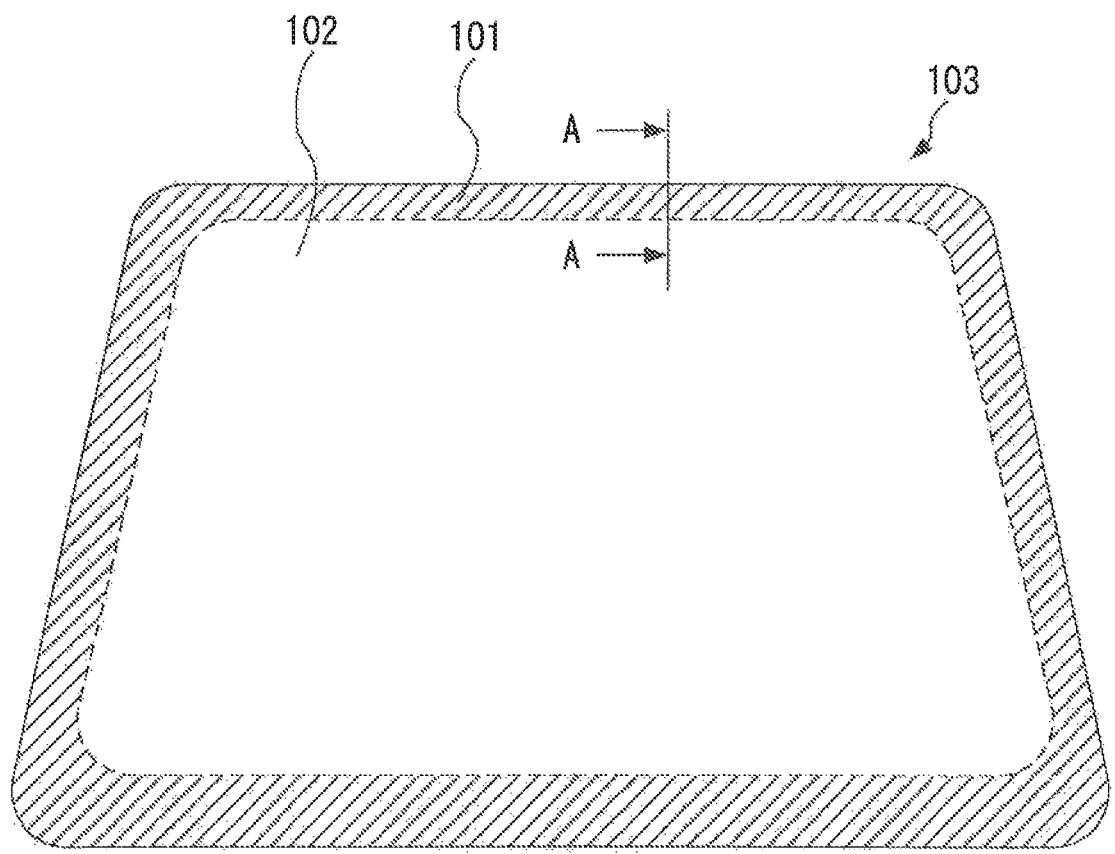
FIG. 1B is a plan view depicting an example of a laminated glass according to the embodiment of the present invention applied to a front windshield of a vehicle.

FIG. 1A is a plan view of a laminated glass that is a laminated plate according to an embodiment of the present invention. Moreover, FIG. 1B is a plan view depicting an example of the laminated glass according to the embodiment applied to a front windshield of a vehicle.

Figure 2:
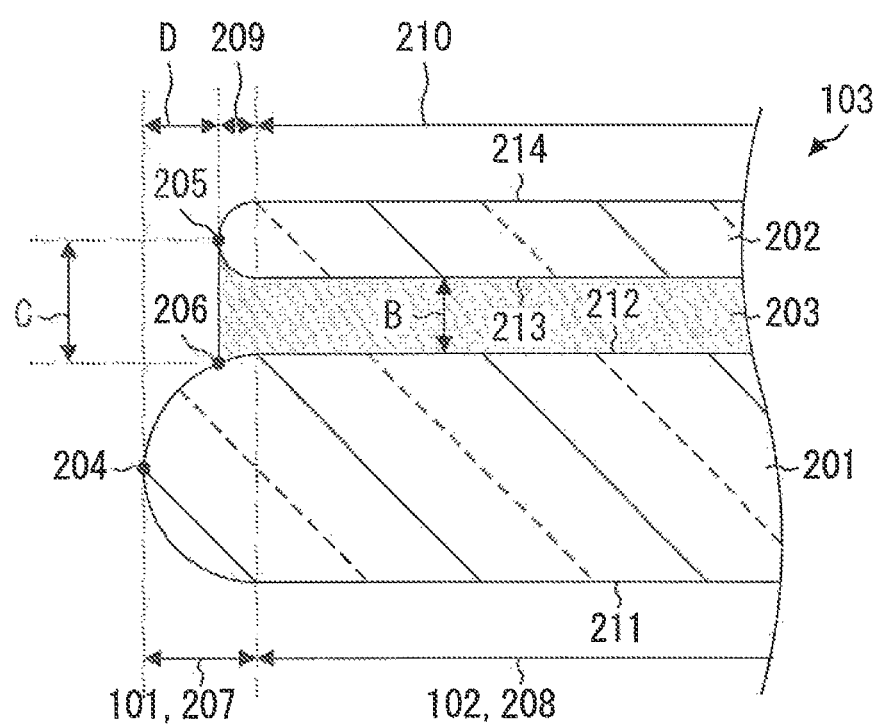
FIG. 2 is a cross section of the laminated plate according to a first embodiment of the present invention cut along a line "A-A" in FIG. 1A.

FIG. 2 is a cross section orthogonal to an outer periphery of the laminated plate according to a first embodiment of the present invention in at least a part of the outer periphery (A-A cross section).

A laminated glass 103 includes, in a planar view, a periphery region 101 and an in-plane region 102. Moreover, the laminated glass 103 includes a first glass plate 201, and a second glass plate 202 bonded to the first glass plate 201 via an intermediate film 203.

The first glass plate 201 includes a first chamfering region 207 that is chamfered in a periphery. Moreover, the first glass plate 201 includes a first non-chamfering region 208 in an in-plane region adjacent to the first chamfering region 207.

The second glass plate 202 includes a second chamfering region 209 that is chamfered in a periphery. Moreover, the second glass plate 202 includes a second non-chamfering region 210 in an in-plane region adjacent to the second chamfering region 209.

The periphery region 101 indicates a region from an outer periphery of the laminated glass 103 to an inner boundary that is a boundary between the first chamfering region 207 and the first non-chamfering region 208 and that is also a boundary between the second chamfering region 209 and the second non-chamfering region 210. The in-plane region 102 indicates a region that occupies the inside of the periphery region 101.

The first glass plate 201 is provided with a first main surface 211 arranged on a side opposite to the intermediate film 203 and a second main surface 212 arranged so as to contact with the intermediate film 203.

The second glass plate 202 is provided with a third main surface 213 arranged so as to contact with the intermediate film 203 and a fourth main surface 214 arranged on a side opposite to the intermediate film 203.

Note that the intermediate film 203 is not particularly limited. The intermediate film 203 may be a single layered intermediate film, or may be a multilayered film. Moreover, the intermediate film 203 may be a film having a plate thickness depending on a site, so that a cross section has a shape of a wedge, for example.

Note that the embodiment of the present invention is not limited to a laminated glass, in which two glass plates are laminated. The embodiment of the present invention may be a laminated glass obtained by bonding two or more glass plates via an intermediate film.

A plate thickness of the first glass plate 201 is thicker than a plate thickness of the second glass plate 202. The plate thickness of the second glass plate 202 is preferably 0.2 mm or more and 1.0 mm or less, more preferably 0.3 mm or more and 0.8 mm or less, and further preferably 0.4 mm or more and 0.7 mm or less.

By making the thickness of the second glass plate 202 less than or equal to 1.0 mm, the laminated glass 103 can be made lighter. Moreover, by making the thickness of the second glass plate 202 thicker than to equal to 0.2 mm, a bending rigidity increases, and thereby an operator can easily handle the second glass plate 202, when conveying the second glass plate 202.

Moreover, in terms of sound insulating property, the thickness of the second glass plate 202 is preferably 0.4 mm or more and 1.8 mm or less, more preferably 0.5 mm or more and 1.6 mm or less, further preferably 0.7 mm or more and 1.6 mm or less, and further preferably 0.8 mm or more and 1.3 mm or less. By making the thickness of the second glass plate 202 fall within the ranges, the laminated glass 103 can be made lighter and the sound insulating property can be prevented from degrading.

Moreover, the thickness of the first glass plate 201 is preferably 1.7 mm or more and 4.0 mm or less, more preferably 2.0 mm or more and 3.7 mm or less, and further preferably 2.5 mm or more and 3.5 mm or less.

By making the thickness of the first glass plate 201 less than or equal to 4.0 mm, the laminated glass 103 can be made lighter. Moreover, by making the thickness of the first glass plate 201 thicker than or equal to 1.5 mm, bending rigidity that is sufficient for the laminated glass 103 can be obtained.

Moreover, in terms of the sound insulating property, the thickness of the first glass plate 201 is preferably 1.5 mm or more and 3.5 mm or less, more preferably 1.5 mm or more and 2.8 mm or less, and further preferably 1.5 mm or more and 2.5 mm or less. By making the thickness of the first glass plate 201 fall within the ranges, the laminated glass 103 can be made lighter and the sound insulating property can be prevented from degrading.

Moreover, a value obtained by dividing the thickness of the second glass plate 202 by the thickness of the first glass plate 201 is preferably 0.1 or more and 0.5 or less, more preferably 0.13 or more and 0.48 or less, and further preferably 0.15 or more and 0.45 or less. By making the value, obtained by dividing the thickness of the second glass plate by the thickness of the first glass plate, thicker than or equal to 0.1 and less than or equal to 0.5, the laminated glass 103 is obtained with a high bending rigidity and a low weight.

Moreover, in terms of the sound insulating property, the value obtained by dividing the thickness of the second glass plate 202 by the thickness of the first glass plate 201 is preferably 0.5 or more and 0.9 or less, more preferably 0.55 or more and 0.85 or less, and further preferably 0.6 or more and 0.8 or less. By making the value, obtained by dividing the thickness of the second glass plate 202 by the thickness of the first glass plate 201, 0.5 or more and 0.9 or less, the laminated glass 103 is obtained with a lower weight and with prevention against degradation of sound insulation property.

Moreover, on the outer periphery of the laminated glass 103, a resin frame body may be attached.

In a cross section orthogonal to the outer periphery (A-A cross section) on at least a part of the outer periphery of the laminated glass 103, a distance C from an outermost periphery 205 of the second glass plate 202 to the first glass plate 201 in the thickness direction with respect to the outermost periphery 205 is less than or equal to three times a distance B between the first glass plate 201 and the second glass plate 202 in the in-plane region 102. Preferably, the distance C is 2.5 times the distance B or less; more preferably, the distance C is 2.3 times the distance B or less; further preferably, the distance C is twice the distance B or less; further preferably 1.8 times the distance B or less; and further preferably, the distance C is 1.5 times the distance B or less.

As the value of the distance C becomes closer to the value of the distance B, the peripheral portion of the laminated glass 103 can be further prevented from foaming. The above-described effect is considered for the following two reasons.

That is, the first reason is suppression of foaming by delamination of the laminated glass 103 from the outer periphery. Typically, delamination of the first glass plate 201 and the second glass plate 202 occurs from the outer periphery. Therefore, when the value of the distance C falls within the above-described range on the outer periphery, entry of air through a gap between the intermediate film 203 and the first glass plate 201 and/or the second glass plate 202 can be controlled.

Figure 8:
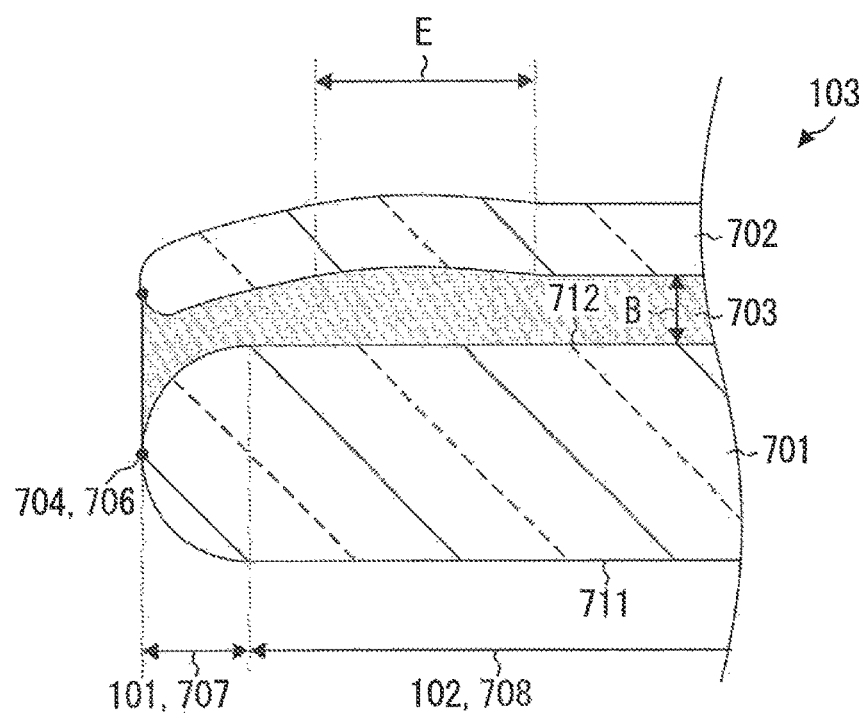
FIG. 8 is a conceptual diagram depicting a state in which an external force for compressing in the plate thickness direction is applied to the laminated plate according to the related art illustrated in FIG. 7.

The second reason is suppression of foaming from the peripheral region 101 and/or a part in the in-plane region 102 adjacent to the peripheral region 101. When the second glass plate 202 is thinner than the first glass plate 201, a stiffness of the second glass plate 202 is less than a stiffness of the first glass plate 201. Therefore, for example, when a force for compressing in the thickness direction is applied around the outer periphery of the laminated glass 103, in the related art, as illustrated in FIG. 8, the second glass plate 202 deflects so that the outermost periphery 205 of the second glass plate 202 moves toward the first glass plate 201. Due to a recoil of the deflection, in the peripheral region 101 and/or the part in the in-plane region 102 adjacent to the peripheral region 101, a force is applied in a direction for delaminating the second glass plate 202 from the first glass plate 201 and the intermediate film 203 (upward direction in FIG. 8). When the value of the distance C falls within the above-described range, the deflection of the second glass plate 202 is small. Therefore, a location E where such a delamination force is generated can be prevented from foaming.

The location E where the delamination force is generated easily occurs in the peripheral region 101 and/or the part in the in-plane region 102 adjacent to the peripheral region 101, rather than the outer periphery.

Moreover, the location E where the delamination force is generated is illustrated in FIG. 8 emphasizing the phenomenon. That is, in practice, the second glass plate 202 at the location E where the delamination force is generated does not deform by expanding in the thickness direction.

In the specification, the "peripheral portion" refers to a portion including the outer periphery and the location E where the delamination force is generated.

Note that the force for compressing near the outer periphery of the laminated glass 103 in the thickness direction includes, for example, a force applied upon performing vacuum pressure-bonding in the process of preparing the laminated glass, and a force applied upon being held by a window frame in between.

Moreover, the outermost periphery 205 of the second glass plate 202 is on the in-plane side of the outermost periphery 204 of the first glass plate 201 in the laminated glass 103.

By arranging the members in the above-described positional relationship, the peripheral portion of the laminated glass 103 can be prevented from foaming. Moreover, the outermost periphery 205 of the second glass plate 202 that is thinner becomes less likely to be broken off by an external force.

Moreover, the outermost periphery 205 of the second glass plate 202 is inside the first chamfered region 207 in the planar view.

By arranging the members in the above-described positional relationship, the peripheral portion of the laminated glass 103 can be prevented from foaming. Moreover, the outermost periphery 205 of the second glass plate 202 that is thinner becomes less likely to be broken off by an external force.

Moreover, when the outermost periphery 205 of the second glass plate 202 is in the first chamfered region 207 in the planar view, the outermost periphery 205 of the second glass plate 202 becomes less likely to be identifiable by a person as a line, in the planar view. Therefore, degradation of appearance can be controlled. Moreover, because a difference in level between the first glass plate 201 and the second glass plate 202 is provided on the outer periphery side, an occurrence of a problem such as an object becoming stuck due to the level difference upon performing wiping cleaning of a window, or an interference with other members, can be controlled.

Because the distance D is determined depending on a difference between the thicknesses of the first glass plate 201 and the second glass plate 202, and how close the distance C is to the distance B, the distance D is not particularly limited. The distance D is preferably 1 mm or less, more preferably, 0.8 mm or less, and further preferably 0.6 mm or less. By making the distance D fall within the above-described range, the peripheral portion of the laminated glass 103 can be prevented from foaming. Moreover, the outermost periphery 205 of the second glass plate 202 that is thinner becomes less likely to be broken off by an external force. Furthermore, an occurrence of a problem such as an object becoming stuck upon performing wiping cleaning of a window, or an interference with other members, can be controlled.

Moreover, when the laminated glass 103 has a curved shape, the first glass plate 201 and the second glass plate 202 may be subjected to bending forming by a conventionally known bending method. For example, the first glass plate 201 and the second glass plate 202 are overlaid and placed on a metallic mold having a shape of a ring. The first and second glass plates 201, 202 may be bent by heating above the softening point temperature, and causing the first and second glass plates to bend by their own weights. Moreover, the first glass plate 201 and the second glass plate 202 may be subjected to press forming, individually or overlaid in a state of being heated.

Moreover, the first glass plate 201 bent in a first bending shape and the second glass plate having a second shape different from the first bending shape may be bonded to each other via the intermediate film 203 to form the laminated glass 103. In such a laminated glass 103, two glass plates are bonded to each other in a state where any of or both the two glass plates are elastically bent (in the following, a manufacturing method of laminated glass by elastically bending any of or both the two glass plates and bonding the two glass plates will be referred to as a "cold bend").

Figure 3:
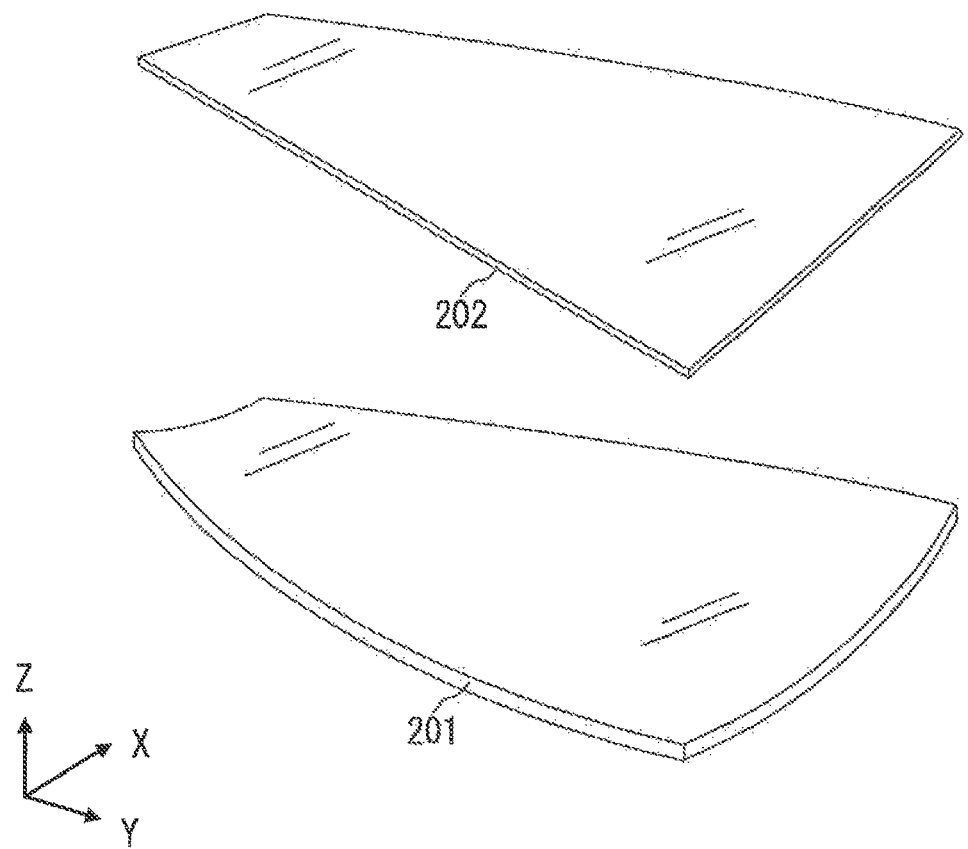
FIG. 3 is a diagram depicting a state of a first glass plate and a second glass plate before being bonded by an intermediate film according to a variation of the first embodiment.
Figure 4:
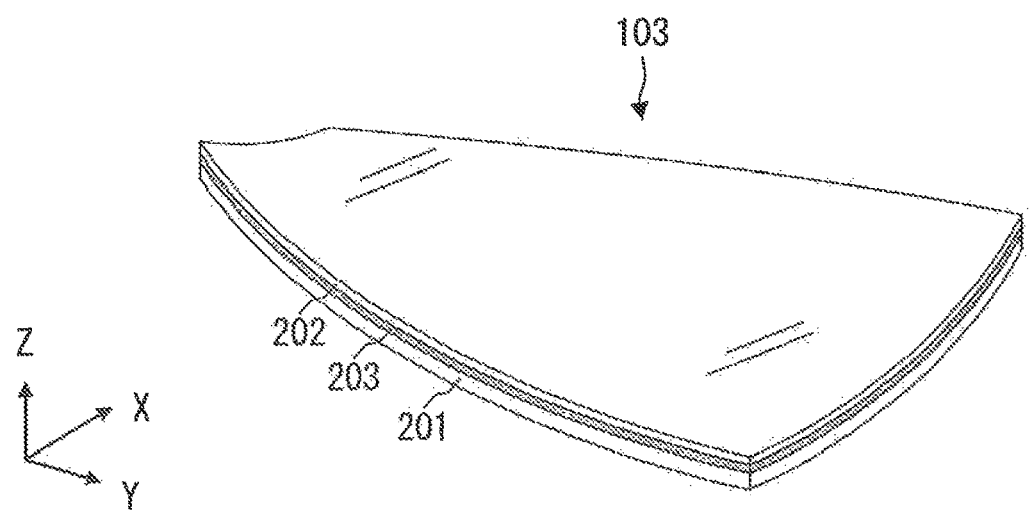
FIG. 4 is a diagram depicting the laminated glass after bonding by the intermediate film from the state illustrated in FIG. 3.

FIG. 3 is a diagram depicting a state of the first glass plate 201 and the second glass plate 202 before being bonded to each other via the intermediate film 203. Moreover, FIG. 4 is a diagram depicting the laminated glass 103 after the bonding via the intermediate film 203 from the state illustrated in FIG. 3.

When the laminated glass 103 has a bending shape of a single curve (cylindrical shape), among cross sections including a normal line at a center of gravity of the laminated glass 103, a cross section having the greatest curvature radius of the first main surface 211 will be referred to as a transverse section. In a cross section corresponding to the transverse section, when the bonding via the intermediate film 203 is removed, the second main surface 212 has a curvature radius less than the third main surface 213.

When the laminated glass 103 has a bending shape of a plurality of curves, among cross sections including a normal line at a center of gravity of the laminated glass 103, a cross section having the greatest curvature radius of the first main surface 211 will be referred to as a transverse section, and a cross section orthogonal to the transverse section will be referred to as a vertical section. On both a cross section corresponding to the transverse section and a cross section corresponding to the vertical section, when the bonding via the intermediate film 203 is removed, the second main surface 212 has a curvature radius less than the third main surface 213.

In this way, the laminated glass 103, in which the first glass plate 201 bent in the first bending shape and the second glass plate 202 having the second shape different from the first bending shape are bonded to each other via the intermediate film 203, has a bending stress by elastic deformation. Especially, when the thickness of the second glass plate 202 is less than that of the first glass plate 201, because two glass plates are bonded to each other in a state where mainly the second glass plate 202 is elastically deformed, the bending stress is generated in the second glass plate 202. In the peripheral region 101 of the second glass plate 202, a bending compressive stress is generated, and around the center of the in-plane region 102 of the second glass plate 202 a bending tensile stress is generated.

The bending compressive stress and the bending tensile stress can be measured by a commercially supplied surface stress meter. When the second glass plate 202 is a strengthened glass, on the fourth main surface 214 of the second glass plate 202, both a residual stress and a bending stress occur. The residual stress is caused by strengthening, and occurs before being bonded. In this case, the bending stress can be obtained by measuring a stress value after bonding and by subtracting a stress value of the second glass plate 202 in a natural state from the measured value.

For example, after the first glass plate 201 is subjected to the bending forming by heat, to form a desired bending shape, the chemically strengthened second glass plate 202 having a shape of a flat plate may be bonded to the first glass plate 201 via the intermediate film. For example, the first glass plate 201 may have a shape with a plurality of curves bent in two orthogonal directions, and the second glass plate 202 may have a shape of a flat plate. By making the first bending shape a shape having a plurality of curves, a window glass for vehicle excellent in design effect can be prepared, and it becomes possible to accommodate a variety of needs for vehicle designs. By making the second shape a shape of a flat plate, a functional film can be easily formed. Furthermore, the bending forming process for the second glass plate 202 can be omitted.

In this way, by using a manufacturing method of laminated glass for elastically deforming any one of two glass plates and bonding the two glass plates, the following advantage is obtained. That is, conventionally, in order to obtain a laminated glass 103 having a bending shape in which a functional film is formed, a method is known for forming the functional film on any of or both glass plates having a shape of a flat plate before forming, heating the two glass plates at around softening point temperature to perform bending forming, and bonding the two glass plates. However, in this method, because the functional film is heated at around the softening point temperature of the glass plates, the function thereof may be degraded.

On the other hand, when the functional film is formed on the second glass plate 202 having a shape of a flat plate, and by using the cold bend and bonding to the first glass plate 201 that is bent and formed in a desired shape, the curved laminated glass 103 is obtained without heating the functional film at around the softening point temperature of the glass plate. Therefore, the function of the functional film can be achieved sufficiently.

Moreover, as another method of obtaining a laminated glass having a bending shape in which a functional film is formed, a method of forming the functional film on a surface of a glass plate after performing the bending forming for the glass plate in a desired bending shape is known. However, this method is more difficult than the method of forming the functional film on a glass plate having a shape of a flat plate, and the process and apparatus become complicated. By using the cold bend, because a functional film can be formed on the second glass plate 202 having a shape of a flat plate, the process and apparatus can be made simplified.

Moreover, by using the cold bend, the process of heating the second glass plate 202 at around the softening point temperature of the glass plate and performing bending forming can be omitted. Especially, when the thickness of the second glass plate 202 is 1 mm or less, because it becomes difficult to maintain accuracy in bending forming due to heating, the cold bend method has a great effect.

Moreover, the second glass plate 202 used in the cold bend may have a second bending shape different from the first bending shape. In the embodiment, the curvature radius of the second bending shape is greater than the curvature radius of the first bending shape. The second glass plate 202 may be bent and formed into the second bending shape by heating or may be bent and formed during the process of chemically strengthening.

Performing bending forming during the process of chemically strengthening refers specifically to increasing penetration of the chemical strengthening for the third main surface 213 relative to the fourth main surface 214, and thereby the second glass plate 202 can be bent and formed so that the third main surface 213 is a convex surface and the fourth main surface 214 is a concave surface. By performing bending forming for the second glass plate 202 during the chemical strengthening, the process of heating the second glass plate 202 at around the softening point temperature of the glass plate and performing bending forming can be omitted. Moreover, when the second glass plate 202 has a bending shape, difference of curvature radii between the first and second bending shapes becomes smaller, and thereby the bending stress occurring on the cold bend can be reduced.

The degree of penetration of the chemical strengthening can be detected, for example, by comparing a quantity Na of the third main surface 213 and a quantity Na of the fourth main surface 214. The quantity Na of the third main surface 213 indicates strength of the Kα-orbit measured by the X-ray fluorescence (XRF), and represents a quantity Na from the surface to the depth of 3 μm of the third main surface 213. The same applies to the fourth main surface 214.

The cold bend is enabled by using a first glass plate 201 fixed by a temporary joining means, such as a tape, a laminated body of a second glass plate 202 and an intermediate film, publicly known preliminary crimping equipment such as a nip roller or a rubber glove, and an autoclave.

In the embodiment, a first cross sectional shape of the first chamfered region 207 and a second cross sectional shape of the second chamfered region 209, in a cross sectional view, are formed by arch-shaped chamfered parts that are chamfered in arch-shaped shapes. However, the first cross sectional shape of the first chamfered region 207 and the second cross sectional shape of the second chamfered region 209 are different from each other. Specifically, a curvature radius of the arch-shaped chamfered part of the first glass plate 201 is greater than a curvature radius of the arch-shaped chamfered part of the second glass plate 202. In this way, because the first cross sectional shape of the first chamfered region 207 and the second cross sectional shape of the second chamfered region 209 are different from each other, each chamfer of the first glass plate 201 or the second glass plate 202 can be designed uniquely.

However, the present invention is not limited to this. The first cross sectional shape and the second cross sectional shape may be chamfered with the same curvature radius. When chamfering is performed with the same curvature radius, upon manufacturing the first glass plate 201 and the second glass plate 202, a grind stone need not be changed. Therefore, management of the manufacturing and the grind stone become easier. Moreover, the first cross sectional shape and the second cross sectional shape may be similar to each other, or different from each other.

In addition, regarding the chamfering method, in order to improve quality of appearance or strength of the outer periphery, chamfering may be performed using a highly meshed diamond wheel, or a mirror finishing may be performed.

In the embodiment, an example where the intermediate film 203 exists to the outermost periphery 205 of the second glass plate 202 is depicted. However, the edge of the intermediate film 203 may be trimmed therefrom. That is, the intermediate film 203 is only required to be present on the in-plane region 102 side of the outermost periphery 205 of the second glass plate 202.

Second Embodiment

Figure 5:
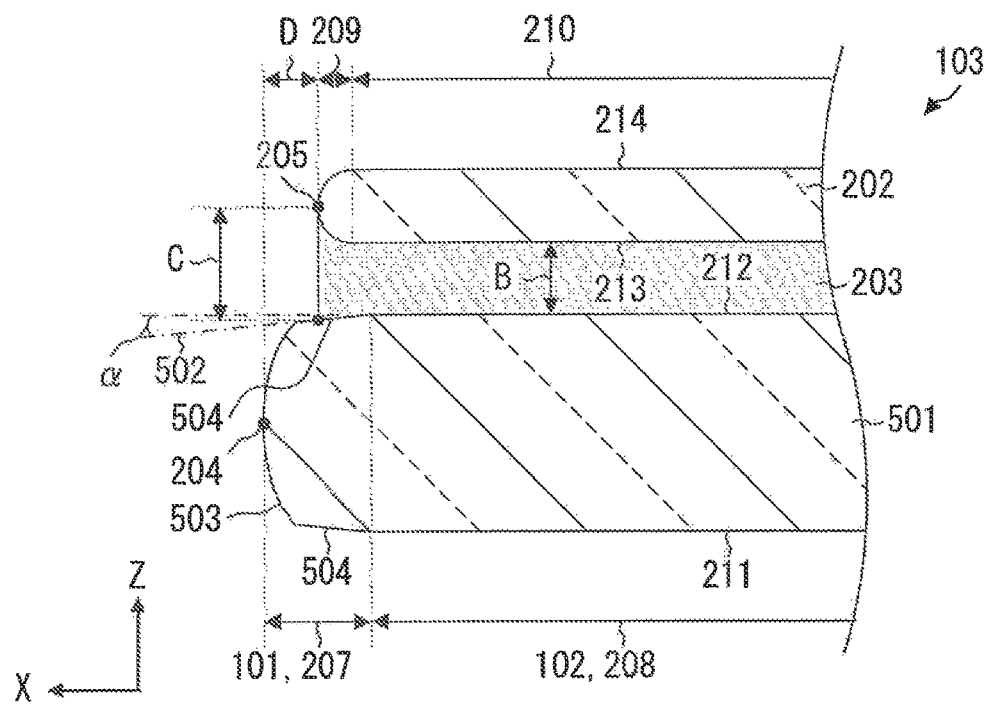
FIG. 5 is a cross section depicting a laminated plate according to a second embodiment of the present invention cut along the line "A-A"

FIG. 5 is a cross-sectional diagram depicting a cross sectional surface cut along A-A of a laminated glass according to a second embodiment. In FIG. 5, for the member having the same configuration as the configuration illustrated in the first embodiment, the same reference numeral will be used as in FIGS. 1A to 2, and an explanation thereof will be omitted.

In the second embodiment, the chamfering shape of the first glass plate is different from that in the first embodiment. In the second embodiment, the first glass plate 501 has an arch-shaped chamfered part 503 that is chamfered in an arch-shaped shape, and a linear chamfered part 504 that is chamfered in a linear shape.

The linear chamfered part 504 is formed so as to connect the arch-shaped chamfered part 503 and the first non-chamfered region 208.

A first tangent line 502 (linear chamfered part 504) with respect to a boundary between the first chamfered region 207 and the first non-chamfered region 208 in the second main surface 212 intersects with the second main surface 212 at a first angle α. The first angle α is preferably greater than 0° and 40° or less. The first angle α is more preferably 5° or more and 35° or less. Further preferably the first angle α is 8° or more and 30° or less.

In a case where the first angle α is 40° or less, even when the outermost periphery 205 of the second glass plate 202 is moved close to the outermost periphery 204 of the first glass plate 501 in order to reduce the distance D, a rapid increase in the distance C is controlled.

Moreover, when the first angle α is 5° or more, because an end part of glass is ground stably against an end surface shape of a grind stone, a breakage of a glass plate during the manufacturing process can be controlled.

Moreover, a length of the linear chamfered part 504 is preferably 0.05 mm or more, more preferably 0.1 mm or more, and further preferably 0.15 mm or more. By making the length as above, the distance C can be reduced and the distance D can also be reduced.

When the first angle α and the linear chamfered part 504 have the above-described values, the distance C can be reduced and at the same time the distance D can also be reduced. That is, the peripheral portion of the laminated glass 103 can be prevented from foaming, and degradation of appearance, an object becoming stuck with another member, and interference with another member, can be controlled.

In the case of the first embodiment, because the chamfered part is composed only of an arch-shaped chamfered part, the first angle α, if defined, is 0°.

Moreover, in the specification, the linear chamfered part 504 is assumed to include a shape of not only a line in a strict sense but also an arch-shaped form that can be approximated to a line. The arch-shaped form that can be approximated to a line is not particularly limited; however, an example is a camber on the order of $1 \times 10^{-1}$ mm or less.

In the embodiment, the first cross sectional shape is depicted to be symmetric with respect to a line that passes through the center of the thickness of the first glass plate 501 and is parallel to the first and second main surfaces 211, 212. But, the first cross sectional shape may be asymmetric. For example, on the first main surface side, an angle between the tangent line with respect to the boundary between the first chamfered region 207 and the first non-chamfered region 208, and the first main surface may be the same as the first angle α, or may be different from the first angle α.

Moreover, the second glass plate 202 may have the same chamfered shape as in the embodiment.

Third Embodiment

Figure 6:
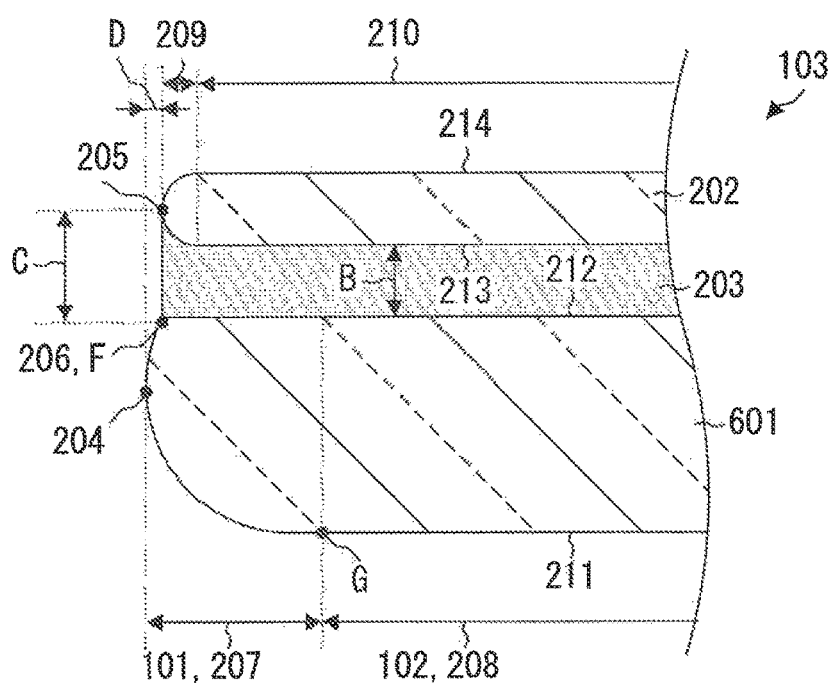
FIG. 6 is a cross section depicting a laminated plate according to a third embodiment of the present invention cut along the line "A-A"
Figure 7:
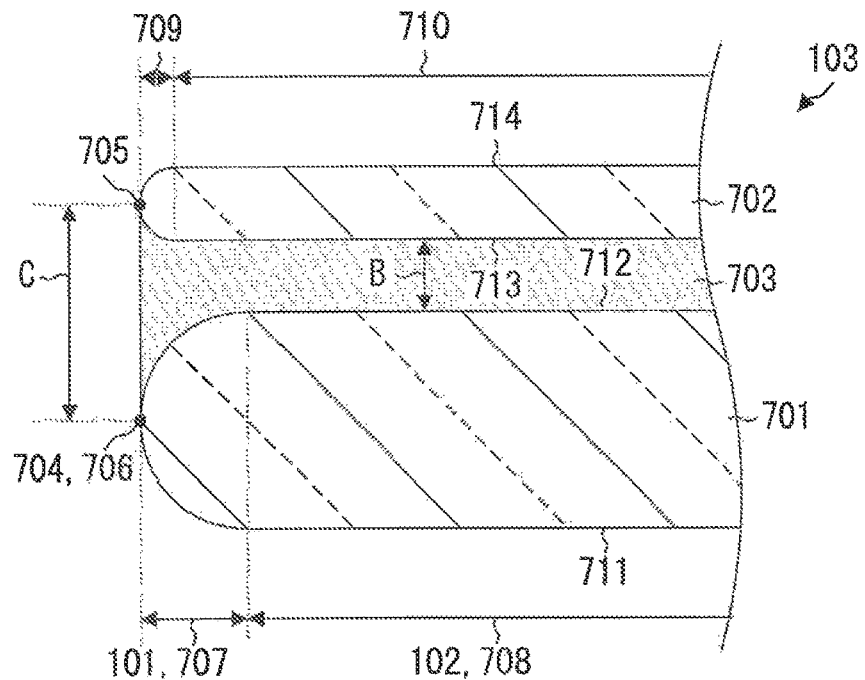
FIG. 7 is a diagram schematically depicting a configuration of a laminated plate according to the related art.

FIG. 6 is a cross-sectional diagram depicting a laminated glass cut along A-A according to a third embodiment. In FIG. 6, to a member having the same configuration as the configuration illustrated in the first embodiment the same reference numeral as in FIGS. 1A to 2 is assigned, and an explanation thereof will be omitted.

In the third embodiment, the chamfered shape of the first glass plate is different from that in the first embodiment. In the third embodiment, the first cross sectional shape is asymmetric with respect to a line that passes through the center of the thickness of the first glass plate 601 and is parallel to the first and second main surfaces 211, 212.

That is, in the cross sectional view, a position G, at a boundary between the first chamfered region 207 and the first non-chamfered region 208 on the first main surface 211 side, is located on the in-plane region 102 side with respect to a position F, at a boundary between the first chamfered region 207 and the first non-chamfered region 208 on the second main surface 212 side.

According to the above-described configuration, the distance C can be reduced and at the same time the distance D also can be reduced. That is, the peripheral region of the laminated glass 103 can be prevented from foaming, and degradation of appearance, an object becoming stuck with another member, and interference with another member, can be controlled.

Moreover, in the cross sectional view, the outermost periphery 204 of the first glass plate 601 is located on the second main surface 212 side. Because on the first main surface 211 side sliding or interference with other members is likely to occur, by arranging the outermost periphery 204 of the first glass plate 601 on the second main surface 212 side, breakage due to an extra load on the outermost periphery 204 of the first glass plate 601 can be controlled.

In addition, the laminated glass 103 is not necessarily provided with the features illustrated in the respective embodiments described in the specification over the whole periphery. For example, the laminated glass 103 may be provided with the feature in any of the edges or may be only in a part of the edge. Even then, the effect of preventing the peripheral portion from foaming can be obtained.

Moreover, in particular, the respective embodiments described in the specification are preferably applied to an exposure part of the peripheral portion of the laminated glass 103 that is not covered with the other member such as the resin frame body or the like. For example, when the resin frame body is attached to the peripheral portion of the laminated glass 103, because the end surface is covered, inherently foaming is not likely to occur. Even if foaming occurs, the foaming is hidden, and a problem of quality of appearance will not appear. However, for the exposure part, because the end surface is exposed, foaming is likely to occur. Furthermore, when the foaming occurs, the problem of quality of appearance becomes easily apparent. Therefore, preventing the peripheral portion from foaming exhibits a great effect.

In the specification, the "exposure part" refers to a part where at least any one of a front surface and a back surface in the peripheral portion of the laminated glass 103 and the end surface of the intermediate film are exposed externally. Even when the front surface and the rear surface and a black shielding film are provided in the peripheral portion, if the part is not covered by the other member such as the resin frame body or the like, the part will be referred to as the exposure part.

INDUSTRIAL APPLICABILITY

The present invention relates to a laminated body, and particularly can be preferably used for a laminated glass in which glass plates are bonded to each other via an intermediate layer.

REFERENCE SIGNS LIST 101 peripheral region
102 in-plane region
103 laminated glass
201,701 first glass plate
202,702 second glass plate
203,703 intermediate film
204,704 outermost periphery of first plate
205,705 outermost periphery of second plate
206,706 intersection point of tangent line at outermost periphery of second plate with first plate
207,707 first chamfered region
208,708 first non-chamfered region
209,709 second chamfered region
210,710 second non-chamfered region
211,711 first main surface
212,712 second main surface
213,713 third main surface
214,714 fourth main surface
B distance between first plate and second plate in in-plane region
C distance from outermost periphery of second plate to first plate in thickness direction at outermost periphery
D distance between outermost periphery of first plate and outermost periphery of second plate in planar direction
E location of delamination force
F position of boundary between first chamfered region and first non-chamfered region on second main surface side
G position of boundary between first chamfered region and first non-chamfered region on first main surface side
α first angle

What is claimed is:
1. A laminated plate provided with a first plate and a second plate bonded to the first plate via an intermediate layer, comprising:
a first main surface of the first plate opposite to the intermediate layer;
a second main surface of the first plate being in contact with the intermediate layer;
a third main surface of the second plate being in contact with the intermediate layer; and
a fourth main surface of the second plate opposite to the intermediate layer, wherein:
the intermediate layer is disposed adjacent to the first plate in a first direction, and the second plate is disposed adjacent to the intermediate layer in the first direction,
a thickness of the first plate in the first direction is greater than a thickness of the second plate in the first direction,
a thickness of the second plate in the first direction is greater than or equal to 0.3 mm and smaller than or equal to 0.8 mm,
a ratio of the thickness of the second plate in the first direction to the thickness of the first plate in the first direction is greater than or equal to 0.1 and less than or equal to 0.5, in a planar view, the laminated plate includes a peripheral region and an in-plane region disposed adjacent to the peripheral region in a second direction orthogonal to the first direction, a distance from the first plate to an outermost periphery of the second plate in the first direction is three times or less a distance in the first direction between the first plate and the second plate in the in-plane region, the outermost periphery of the second plate is disposed closer to the in-plane region than is an outermost periphery of the first plate, the first plate includes a first chamfered region that is chamfered and is disposed in the peripheral region, the first plate includes a first non-chamfered region adjacent to the first chamfered region in the second direction and disposed in the in-plane region, in the planar view, the outermost periphery of the second plate is in the first chamfered region in the first direction, the first plate and the second plate are glass plates, the laminated plate constitutes at least a portion of a vehicle window, wherein the second plate includes a second chamfered region that is chamfered and is disposed in the peripheral region, wherein the second plate includes a second non-chamfered region adjacent to the second chamfered region in the second direction and disposed in the in-plane region, and wherein in a cross section along the first direction, a first cross-sectional shape of the first chamfered region is different from a second cross-sectional shape of the second chamfered region.

2. The laminated plate according to claim 1, wherein in the cross section along the first direction, the first chamfered region includes a linear chamfered part.

3. The laminated plate according to claim 2, wherein in the cross section along the first direction, the first chamfered region includes an arch-shaped chamfered part, and wherein the linear chamfered part is formed so as to connect the arch-shaped chamfered part and the first non-chamfered region.

4. The laminated plate according to claim 1, wherein in the cross section along the first direction, a first tangent line at a boundary between the first chamfered region and the first non-chamfered region at the second main surface intersects with the second main surface at a first angle, the first angle being greater than 0 degrees and less than or equal to 40 degrees.

5. The laminated plate according to claim 1, wherein in the cross section along the first direction, a boundary between the first chamfered region and the first non-chamfered region at the first main surface is located closer to the in-plane region than is a boundary between the first chamfered region and the first non-chamfered region at the second main surface.

6. The laminated plate according to claim 1, wherein in the cross section along the first direction, the outermost periphery of the first plate is located closer to the second main surface than to the first main surface.

7. The laminated plate according to claim 1, wherein in the cross section along the first direction, a distance between the outermost periphery of the first plate and the outermost periphery of the second plate in the second direction is less than or equal to 1 mm.

8. The laminated plate according to claim 1, wherein the laminated plate is configured such when the bonding via the intermediate layer is removed, in a transverse cross section, the second main surface has a curvature radius less than a curvature radius of the third main surface, wherein the transverse cross section is a cross section, among cross sections each including a normal line at a center of gravity of the laminated plate, which has the greatest curvature radius of the first main surface.

9. The laminated plate according to claim 1, wherein in both a transverse cross section and a vertical cross section, when the bonding via the intermediate layer is removed, the second main surface has a curvature radius less than a curvature radius of the third main surface, wherein the transverse cross section is a cross section, among cross sections each including a normal line at a center of gravity of the laminated plate, which has the greatest curvature radius of the first main surface, and the vertical cross section is a cross section orthogonal to the transverse section.

10. The laminated plate according to claim 1, wherein the laminated plate has a bending compressive stress in the peripheral region, and a bending tensile stress in the in-plane region.

11. The laminated plate according to claim 1 further comprising an exposure part that is exposed from a resin frame body, wherein the outermost periphery of the second plate and the first chamfering region of the first plate are disposed in the exposure part.

12. The laminated plate according to claim 1, a thickness of the first plate in the first direction is 1.7 mm or more and 4.0 mm or less.

13. The laminated plate according to claim 1, a value obtained by dividing the thickness in the first direction of the second plate by the thickness in the first direction of the first plate is 0.5 or more and 0.9 or less.

14. The laminated plate according to claim 1, the laminated plate has a curved shape.

15. The laminated plate according to claim 1, the laminated plate has a bending shape comprising a plurality of curves.

16. The laminated plate according to claim 1, wherein in the laminated plate, the first plate is bent in a first bending shape and the second plate has a second shape different from the first bending shape.

* * * * *